US010981567B2

(12) United States Patent
Sapp et al.

(10) Patent No.: US 10,981,567 B2
(45) Date of Patent: *Apr. 20, 2021

(54) FEATURE-BASED PREDICTION

(71) Applicant: Zoox, Inc., Foster City, CA (US)

(72) Inventors: Benjamin John Sapp, San Francisco, CA (US); Daylen Guang Yu Yang, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,228

(22) Filed: Aug. 8, 2019

(65) Prior Publication Data

US 2019/0359208 A1    Nov. 28, 2019

Related U.S. Application Data

(63) Continuation of application No. 15/947,486, filed on Apr. 6, 2018, now Pat. No. 10,414,395.

(51) Int. Cl.
*B60W 30/00* (2006.01)
*B60W 30/095* (2012.01)
(Continued)

(52) U.S. Cl.
CPC ......... *B60W 30/0956* (2013.01); *G01S 13/00* (2013.01); *G01S 13/931* (2013.01);
(Continued)

(58) Field of Classification Search
None
See application file for complete search history.

(56) References Cited

U.S. PATENT DOCUMENTS 5,177,685 A    1/1993  Davis et al.
6,707,421 B1   3/2004  Drury et al.
(Continued)

FOREIGN PATENT DOCUMENTS

EP    3217332    9/2017
GB    2547082    8/2017
(Continued)

OTHER PUBLICATIONS

U.S. Appl. No. 15/632,208, filed Jun. 23, 2017, Linscott, et al., "Trajectory Generation and Execution Architecture", 63 pages.
(Continued)

*Primary Examiner* — Richard M Camby
(74) *Attorney, Agent, or Firm* — Lee & Hayes, P.C.

(57) ABSTRACT

Feature-based prediction is described. In an example, a vehicle can capture sensor data while traversing an environment and can provide the sensor data to computing system(s). The sensor data can indicate event(s), such as a lane change, associated with agent(s) in the environment. The computing system(s) can determine, based on the sensor data, a time associated with the event and can determine features associated with a period of time relative to the time of the event. In an example, the computing system(s) can aggregate the features with additional features associated with other similar events to generate training data and can train, based at least in part on the training data, a machine learned model for predicting new events. In an example, the machine learned model can be transmitted to vehicle(s), which can be configured to alter drive operation(s) based, at least partly, on output(s) of the machine learned model.

20 Claims, 6 Drawing Sheets

(51) Int. Cl.
| | |
|---|---|
| *G06N 20/00* | (2019.01) |
| *G01S 13/931* | (2020.01) |
| *G05D 1/02* | (2020.01) |
| *G06K 9/00* | (2006.01) |
| *G01S 13/00* | (2006.01) |
| *G08G 1/00* | (2006.01) |
| *G06N 5/00* | (2006.01) |
| *G06N 20/20* | (2019.01) |

(52) U.S. Cl.
CPC ....... *G05D 1/0221* (2013.01); *G06K 9/00791* (2013.01); *G06K 9/00798* (2013.01); *G06K 9/00825* (2013.01); *G06N 20/00* (2019.01); *G08G 1/00* (2013.01); *B60W 2554/00* (2020.02); *G05D 2201/0213* (2013.01); *G06K 2009/00738* (2013.01); *G06N 5/003* (2013.01); *G06N 20/20* (2019.01)

(56) References Cited

U.S. PATENT DOCUMENTS

| | | | |
|---|---|---|---|
| 8,112,225 | B2 | 2/2012 | Eidehall et al. |
| 8,121,749 | B1 | 2/2012 | Agrawal et al. |
| 8,473,447 | B2 | 6/2013 | Yoon et al. |
| 8,645,310 | B2 | 2/2014 | Jiang et al. |
| 8,880,272 | B1 | 11/2014 | Ferguson et al. |
| 9,381,916 | B1 * | 7/2016 | Zhu .................. B60W 30/0956 |
| 9,495,874 | B1 * | 11/2016 | Zhu ......................... G06N 20/00 |
| 9,507,347 | B1 | 11/2016 | Ogale et al. |
| 9,558,659 | B1 | 1/2017 | Silver et al. |
| 9,568,915 | B1 | 2/2017 | Berntorp et al. |
| 9,612,123 | B1 | 4/2017 | Levinson et al. |
| 10,059,334 | B1 * | 8/2018 | Zhu ..................... B60W 30/095 |
| 10,061,322 | B1 | 8/2018 | Palefsky-Smith |
| 10,387,736 | B2 | 8/2019 | Wang et al. |
| 2003/0187578 | A1 | 10/2003 | Nishira et al. |
| 2005/0049785 | A1 | 3/2005 | Vergin |
| 2011/0125344 | A1 | 5/2011 | An et al. |
| 2011/0205042 | A1 | 8/2011 | Takemura et al. |
| 2014/0324268 | A1 | 10/2014 | Montemerlo et al. |
| 2017/0031361 | A1 | 2/2017 | Olson et al. |
| 2017/0131719 | A1 | 5/2017 | Micks |
| 2017/0192426 | A1 | 7/2017 | Rust |
| 2017/0192437 | A1 | 7/2017 | Bier et al. |
| 2017/0193338 | A1 | 7/2017 | Huberman et al. |
| 2017/0277195 | A1 | 9/2017 | Frazzoli et al. |
| 2017/0364758 | A1 | 12/2017 | Minster |
| 2018/0068191 | A1 | 3/2018 | Biemer et al. |
| 2018/0095465 | A1 | 4/2018 | Gao et al. |
| 2018/0137380 | A1 | 5/2018 | Alrefai et al. |
| 2018/0144202 | A1 | 5/2018 | Moosaei et al. |
| 2018/0148051 | A1 | 5/2018 | Lujan et al. |
| 2018/0164816 | A1 | 6/2018 | Hashimoto et al. |
| 2018/0224860 | A1 | 8/2018 | Warshauer-Baker et al. |
| 2018/0251126 | A1 | 9/2018 | Linscott et al. |
| 2019/0025841 | A1 | 1/2019 | Haynes et al. |
| 2019/0051069 | A1 | 2/2019 | Cooley |
| 2019/0061765 | A1 | 2/2019 | Marden et al. |
| 2019/0092318 | A1 * | 3/2019 | Mei .................... G06K 9/00825 |
| 2019/0101919 | A1 | 4/2019 | Kobilarov et al. |
| 2019/0122059 | A1 | 4/2019 | Zhou et al. |
| 2019/0250626 | A1 | 8/2019 | Ghafarianzadeh et al. |
| 2019/0272750 | A1 | 9/2019 | Fukumoto et al. |
| 2019/0308620 | A1 | 10/2019 | Sapp et al. |
| 2019/0329769 | A1 | 10/2019 | Shalev-Shwartz et al. |
| 2019/0344804 | A1 | 11/2019 | Motomura et al. |
| 2019/0354786 | A1 | 11/2019 | Lee et al. |
| 2019/0361443 | A1 | 11/2019 | Linscott et al. |
| 2020/0086855 | A1 | 3/2020 | Packer et al. |
| 2020/0110416 | A1 | 4/2020 | Hong et al. |

FOREIGN PATENT DOCUMENTS

| | | |
|---|---|---|
| WO | WO2016130719 A2 | 8/2016 |
| WO | WO2017091690 A1 | 6/2017 |

OTHER PUBLICATIONS

Anonymous "Outline of machine learning—Wikipedia", Mar. 27, 2018, Retrieved from the Internet: URL:https://en.wikipedia.org/w/index.php?title=Outline_of_machine_learning&oldid=832722436, retrieved on Jul. 9, 2019, section entitled "Machine learning methods", 28 pages.

Broadhurst et al., "Monte Carlo Road Safety Reasoning", Proc IEEE Intelligent Vehicles Symposium, Jun. 2005, 6 pgs.

Gu et al, "On-Road Motion Planning for Autonomous Vehicles", Proc 5th intl conf on Intelligent Robotics and Applications, vol. Part III, ICIRA Oct. 2012, 10 pgs.

Heinemann, "Predicting Cut-Ins in Traffic Using a Neural Network", Master's thesis in Systems, Control and Mechatronics, Jan. 1, 2017, Retrieved from the Internet: URL:https://pdfs.semanticscholar.org/be17/0747667db2db224ccbe3f909ad99de14c78a.pdf [retrieved on Jul. 9, 2019], section 5.1 & 6, pp. 9-11.

McMahon et al., "Sampling-Based Tree Search with Discrete Abstractions for Motion Planning with Dynamics and Temporal Logic", IEEE/RSJ Intl Conf on Intelligent Robots and Systems, Sep. 2014, 9 pgs.

Office Action for U.S. Appl. No. 15/632,147, dated Apr. 30, 2018, Kobilarov et al., "Trajectory Generation Using Temporal Logic and Tree Search", 6 pages.

The PCT Invitation to Pay Additional Fees dated Jun. 6, 2018 for PCT application No. PCT/US2018/019685, 12 pages.

The PCT Search Report and Written Opinion dated Jul. 17, 2019, for PCT Application No. PCT/US2019/025226, 13 pages.

The PCT Search Report and Written Opinion dated Apr. 15, 2019, for PCT Application No. PCT/US2019/016407, 11 pages.

The PCT Search Report and Written Opinion dated Jul. 30, 2018, for PCT Application No. PCT/US18/19685, 17 pages.

Wongpiromsarn et al., "Receding Horizon Temporal Logic Planning", IEEE Transactions on Automatic Control, vol. 57, Issue 11, Nov. 2012, 14 pgs.

Office Action for U.S. Appl. No. 15/833,715, dated Oct. 2, 2019, Kobilarov et al., "Trajectory Prediction of Third Party Objects Using Temporal Logic and Tree Search", 12 pages.

Office Action for U.S. Appl. No. 16/193,801, dated Oct. 24, 2019, Kobilarov, "Trajectory Generation Using Temporal Logic and Tree Search", 8 pages.

Non Final Office Action dated Dec. 16, 2019 for U.S. Appl. No. 15/982,658 "Vehicle Lighting State Determination" Lee, 30 pages.

The PCT Search Report and Written Opinion dated Aug. 22, 2019 for PCT Application No. PCT/US2019/031057, 8 pages.

Final Office Action dated Apr. 27, 2020 for U.S. Appl. No. 15/982,658 "Vehicle Lighting State Determination" Lee, 32 pages.

Non Final Office Action dated May 18, 2020 for U.S. Appl. No. 15/897,028 "Detecting Blocking Objects" Ghafarianzadeh, 21 pages.

Non Final Office Action dated Aug. 13, 2020 for U.S. Appl. No. 15/982,658, "Vehicle Lighting State Determination", Lee, 33 pages.

* cited by examiner

FEATURE-BASED PREDICTION

This Application is a continuation of, and claims priority to U.S. patent application Ser. No. 15/947,486, filed Apr. 6, 2018, which is incorporated herein by reference.

BACKGROUND

In general, prediction systems utilize information associated with agents in an environment to infer future actions of the agents, such as trajectories. Some existing prediction systems utilize hand-crafted or hand-coded rules to predict these future actions, for example. However, sensor data can be noisy and does not always correspond to such hand-crafted or hand-coded rules, introducing prediction errors and thus making resulting predictions inaccurate and/or unreliable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
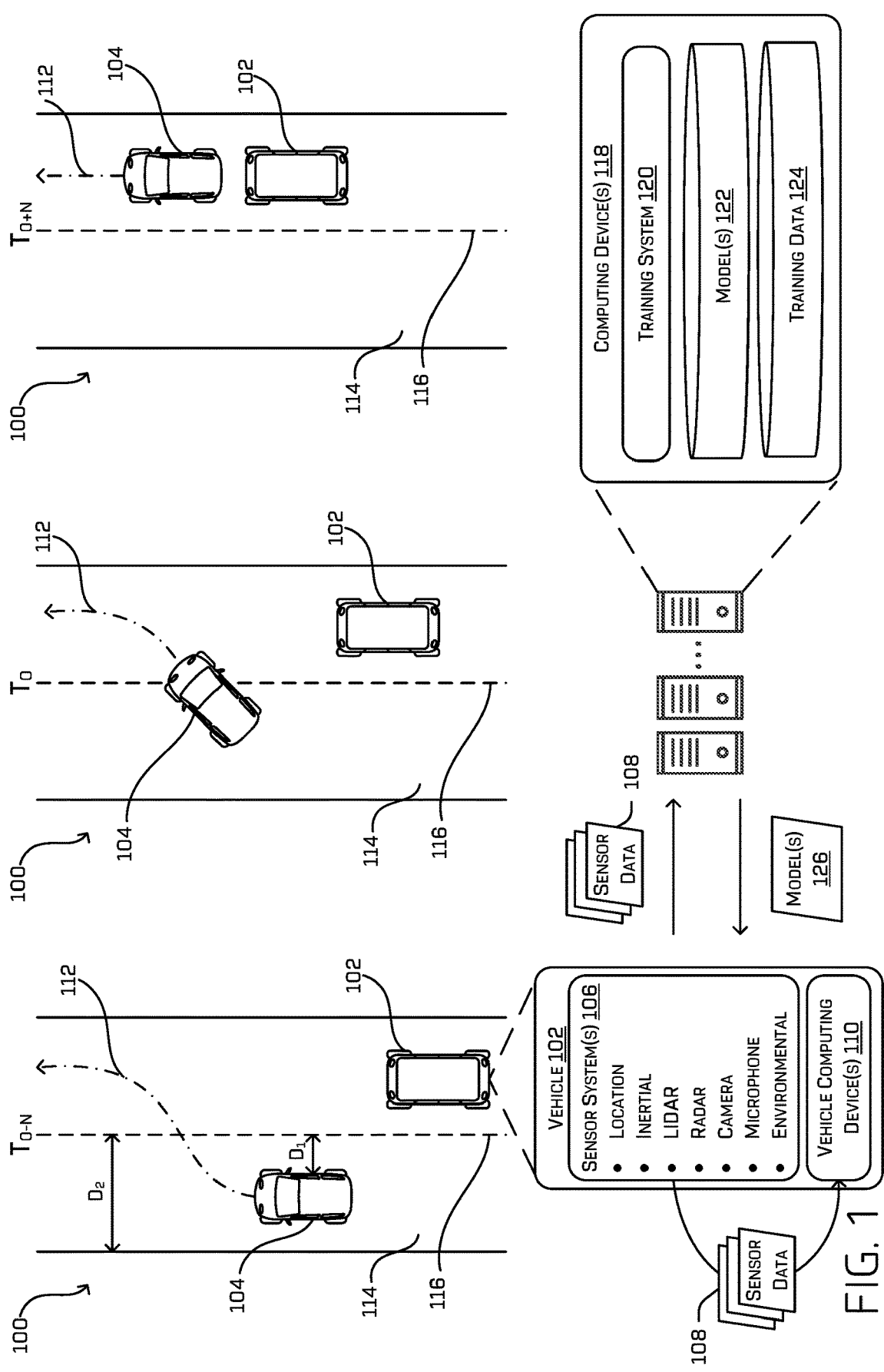
FIG. 1 is a schematic diagram illustrating an example implementation of generating a machine learned model for use with feature-based prediction as described herein.

Techniques described herein are directed to training a machine learned model to predict particular behaviors of agents (e.g., pedestrians, animals, cyclists, other vehicles, etc.) in an environment of a vehicle. In at least one example, the machine learned model can be trained based on automatically labeled data previously collected by one or more vehicles in an environment. For the purpose of this discussion, data can be "automatically labeled" such that events and/or features associated with such events can be determined without human input. In at least one example, the machine learned model can be provided to an autonomous vehicle, and can be utilized by computing device(s) onboard the autonomous vehicle to predict how agents proximate the autonomous vehicle are likely to behave. The computing device(s) onboard the autonomous vehicle can utilize such predictions to determine how to navigate the autonomous vehicle in the environment. That is, the computing device(s) onboard the autonomous vehicle can adapt driving operations based on predictions output by the machine learned model.

As a non-limiting example, a machine learned model can be trained to predict when a vehicle is going to enter a lane region directly in front of an autonomous vehicle (e.g., "cut-in"), such as by changing lanes in front of the autonomous vehicle or entering a lane from a parking lane or space. In some instances, the autonomous vehicle can utilize the machine learned model to (i) predict when a vehicle proximate the autonomous vehicle is going to change lanes and (ii) determine a trajectory to navigate the autonomous vehicle to accommodate the lane change (e.g., slow the vehicle such to increase a follow distance between the vehicle and another vehicle). Further, a machine learned model can be trained to predict when a pedestrian is going to cross a crosswalk, and the autonomous vehicle can utilize the machine learned model to (i) predict when a pedestrian proximate the autonomous vehicle is going to cross at a crosswalk and (ii) determine a trajectory to navigate the autonomous vehicle to accommodate the pedestrian crossing the crosswalk (e.g., slow the vehicle to a stop to allow the pedestrian to cross). Machine learned models can be trained to predict other agent behaviors and can be used in same and/or similar ways to navigate autonomous vehicles.

Techniques described herein are directed to leveraging machine learned models to enable a vehicle, such as an autonomous vehicle, to predict the behavior of agents in its environment. Techniques described herein can utilize noisy sensor data to predict the behavior of agents in an environment associated with a vehicle more accurately than with existing prediction techniques. That is, techniques described herein provide a technological improvement over existing prediction technology. In addition to improving the accuracy with which sensor data can be used to predict behaviors of agents in an environment of a vehicle, techniques described herein can reduce false positives and improve safety outcomes.

FIGS. 1-6 below provide additional details associated with techniques described herein.

FIG. 1 is a schematic diagram illustrating an example implementation of generating a machine learned model for use with feature-based prediction as described herein. FIG. 1 illustrates an example environment 100 in which a vehicle 102 is positioned. In some examples, the vehicle 102 can be driving in the environment 100. In other examples, the vehicle 102 can be parked in the environment 100. One or more agents can also be positioned in the environment 100. For instance, FIG. 1 illustrates another vehicle 104 in the environment 100. Of course, any number and/or types of agents can additionally or alternatively be positioned in the environment 100.

For the purpose of illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, the vehicle 102 can be associated with one or more sensor systems 106. The sensor system(s)

106 can include, but is not limited to, light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc. The sensor system(s) 106 can generate sensor data 108, which can be utilized by vehicle computing device(s) 110 associated with the vehicle 102.

In at least one example, the vehicle computing device(s) 110 can include a perception system, which can perform agent detection, segmentation, and/or classification based at least in part on the sensor data 108 received from the sensor system(s) 106. For instance, the perception system can detect the vehicle 104 in the environment 100 based on sensor data 108 generated by the sensor system(s) 106. Additionally, the perception system can determine an extent of the vehicle 104 (e.g., height, weight, length, etc.), a pose of the vehicle 104 (e.g., x-coordinate, y-coordinate, z-coordinate, pitch, roll, yaw), etc. The sensor system(s) 106 can continuously generate sensor data 108 (e.g., in near-real time), which can be utilized by the perception system (and other systems of the vehicle computing device(s) 110).

FIG. 1 illustrates three discrete instances of time (e.g., $T_{0-N}$, $T_0$, and $T_{0+N}$). For the purpose of this discussion, $T_0$ corresponds to an occurrence of an event, which in FIG. 1 is a lane change (e.g., a "cut-in event"), as illustrated by the trajectory 112 shown in the environment 100. A cut-in event can occur when a proximate vehicle changes from a first lane (e.g., associated with a first lane identifier) to a second lane (e.g., associated with a second lane identifier) while driving, pulls out of a parallel parking spot (e.g., changes from a parking lane to a driving lane), etc. In at least one example, the occurrence of the event (e.g., the cut-in) can correspond to a time that a portion of the vehicle 104 crosses a lane line 116 of a road 114 (e.g., the lane identifier associated with the vehicle 104 changes). $T_{0-N}$ represents a time prior to the occurrence of the event and $T_{0+N}$ represents a time after the occurrence of the event. The period of time from $T_{0-N}$ to $T_{0+N}$ can be configurable and in some instances, may not be symmetrical about $T_0$ (e.g., a period of time may span from $T_{0-N}$ to $T_{0+M}$). In at least one example, the sensor system(s) 106 associated with the vehicle 102 can generate sensor data 108 at least from $T_{0-N}$ to $T_{0+N}$. The sensor data 108 can indicate at least an extent of the vehicle 104 (e.g., height, weight, length, etc.), a pose of the vehicle 104 (e.g., x-coordinate, y-coordinate, z-coordinate, pitch, roll, yaw), etc. from $T_{0-N}$ to $T_{0+N}$, which can be used to determine one or more features, as described below. The sensor system(s) 106 and/or the vehicle computing device(s) 110 can send the sensor data 108 to one or more computing devices 118. The computing device(s) 118 can include a training system 120, a model storage 122, and a training data storage 124.

In addition to receiving sensor data 108 from the vehicle 102, the computing device(s) 118 can receive additional sensor data from other vehicles and/or data collection devices in the environment 100 and/or other environments, as well as any sensor data 108 collected at different times (e.g., from $T_{X-N}$ to $T_{X+N}$). The sensor data 108 can be stored in the training data storage 124 with the additional sensor data received from the other vehicles and/or data collection devices. In at least one example, sensor data collected over time can represent a log. Logs can be used to determine how an agent, such as the vehicle 104, moved over time and can be utilized for determining features, as described below.

In at least one example, the training system 120 can analyze the sensor data 108 and/or map data associated with map(s) of the environment 100 to determine an event (e.g., a cut-in event, as illustrated in FIG. 1). In at least one example, the training system 120 can determine a time (e.g., To) associated with the event (which can be determined by the sensor data 108 and/or the map data). In at least one example, the time can be associated with a timestamp. The training system 120 can determine features for a period of time relative to the time. In an example, the period of time can be partitioned into samples, which can correspond to portions of the period of time that are prior to the time, corresponding to the time, and/or following the time. For a period of time, the training system 120 can analyze the sensor data 108 associated with the corresponding period of time (e.g., each of the samples associated with the period of time) and/or the map data to determine features associated with the vehicle 104 and/or the environment 100 during the particular period of time. These features can be indicative of a behavior of the vehicle 104 before, during, and/or after the event.

In at least one example, the training system 120 can determine such features as an extent of the vehicle 104 (e.g., height, weight, length, etc.), a pose of the vehicle 104 (e.g., x-coordinate, y-coordinate, z-coordinate, pitch, roll, yaw), a velocity of the vehicle 104, an acceleration of the vehicle 104, a direction of travel of the vehicle 104 (e.g., a heading), etc. during a period of time. Additional features may be determined based on such features (e.g., determining a yaw rate based on a detected yaw over time) and/or other sensor data and/or map data associated with a map of the environment 100. In some examples, at least some of the features (e.g., the extent, the pose, etc.) can be determined by a perception system onboard the vehicle 102, though any features may be determined at other computing devices. Furthermore, the training system 120 can determine a distance between the vehicle 104 and a proximate driving lane (as shown by $D_1$), a width of a current driving lane (as shown by $D_2$), etc., which can be informed by map data, during a period of time. Additionally and/or alternatively, the training system 120 can determine semantic feature(s) associated with the vehicle 104 and/or the environment 100, during a period of time. Semantic features can include, but are not limited to, signs in the environment 100 (e.g., "lane ending," "merge left," etc.), construction symbols in the environment 100 (e.g., cones, barricades, etc.), lane permissions in the environment 100 (e.g., "left turn only," "must turn right," etc.), light symbols in the environment 100 (e.g., blinkers, street lights, etc.), etc. The semantic feature(s) can be determined based on the sensor data 108 and/or map data. In at least one example, features can include interactive features which can include, but are not limited to, relative velocities between the vehicle 104 and other vehicle(s), relative distances between the vehicle 104 and other vehicle(s) (e.g., to determine if there is enough space to cut-in), etc.

In some examples, features may be determined for each of a number of samples over a period of time, which may, in some examples, be sampled evenly. The features corresponding to the period of time as a whole can be determined based on a totality of features from each sample. For instance, features may be determined for each of 10 samples, each corresponding to sequential 0.2 seconds of data over a 2 second period of time. In such an example, features corresponding to the entire 2 seconds may be determined based at least in part on the features determined for each of the 10 samples of sensor data. In some examples, the samples may not overlap (e.g., as described above). In other examples, the samples can overlap. For instance, in an alternate example, a 2 second time period can comprise more than 10 0.2 second samples.

The training system 120 can determine features associated with individual periods of time (e.g., as observed from sensor data 108 received from the vehicle 102, other vehicle(s), and/or other data collection device(s) and/or map data) and can aggregate such data to generate training data, which can be stored in the training data storage 124. That is, the training data can include features determined for individual periods of time, which can be associated with a period of time prior to, during, and/or after one or more events. In at least one example, the training system 120 can access the training data and can leverage the training data to train a machine learned model. That is, the training system 120 can train the machine learned model based on features associated with individual periods of time prior to, during, and/or after an occurrence of one or more events. Additional details associated with training the machine learned model are described below.

The machine learned model(s) 126 can be stored in the model storage 122 and/or can be provisioned to the vehicle 102. In at least one example, the training system 120 can train the machine learned model off-line (e.g., not onboard the vehicle 102 while the vehicle 102 is operating in the environment 100). That is, the training system 120 can train the machine learned model based on batched data (e.g., log data derived from sensor data). In some examples, the machine learned model(s) 126 can be stored in the model storage 122. In additional or alternative examples, the machine learned model(s) 126 can be provisioned to the vehicle 102 for use while operating in the environment 100. In other examples, the training system 120 can train the machine learned model on-line (e.g., training the machine learned model based on instantly acquired data).

In at least one example, the resulting machine learned model(s) 126 can be utilized by the vehicle computing device(s) 110 to analyze new sensor data and output a prediction associated with a particular event while the vehicle 102 is operating in the environment. In the context of FIG. 1, the vehicle computing device(s) 110 can analyze sensor data associated with an agent in the environment and/or map data associated with the environment utilizing the machine learned model(s) 126, and can determine that a particular agent is going to change lanes. Responsive to such a determination, the vehicle computing device(s) 110 can determine a trajectory for navigating the vehicle 102 to accommodate the lane change. For example, by predicting the cut-in event, the vehicle computing device(s) 110 can determine to change a trajectory earlier, giving the vehicle 102 more time to react. In some examples, the trajectory for navigating the vehicle 102 may include a trajectory to follow a car in front of it with a minimum following distance. The cut-in event can place the agent vehicle closer to the vehicle 102 than the minimum following distance. Accordingly, by predicting the cut-in event, the vehicle computing device(s) 110 can determine a trajectory to slow the vehicle 102 down or to cause the vehicle 102 to change lanes to reestablish a safe following distance. Additional or alternative examples are within the scope of this disclosure.

FIG. 1 is but one example of training and/or utilizing feature-based prediction, as described herein. Additional and/or alternative examples can be imagined. For instance, machine learned models can be trained to predict other events that correspond to a transition from a first intent to a second intent. For instance, machine learned models can be trained to predict other events, such as a pedestrian entering a crosswalk, a pedestrian crossing a crosswalk, a vehicle (or other object) entering a junction, direction of travel of a vehicle (or other object) through a junction, a vehicle (or other object) departing from a stop line, etc. In such examples, the machine learned models can be utilized onboard an autonomous vehicle to predict such events in near real-time and determine how to navigate the autonomous vehicle responsive to such prediction.

In such examples, features can be related to an object associated with the event (e.g., entering a crosswalk, crossing a crosswalk, entering a junction). Such features can include an extent of an object (e.g., height, weight, length, etc.), a pose of the object (e.g., x-coordinate, y-coordinate, z-coordinate, pitch, roll, yaw), a velocity of the object, acceleration of the object, a direction of travel of the object (e.g., heading), etc., as described above. Additionally or alternatively, such features can include an orientation relative to a sensor (e.g., which direction is a pedestrian facing), distance to a map feature (e.g., a start of a crosswalk, an end of a crosswalk, a side of a crosswalk, a start of a junction, an end of a junction, a side of a junction, etc.), semantic features (e.g., crosswalk sign, traffic lights, etc.), feasibility of performing an intent (e.g., cross-ability of a crosswalk, etc.), etc.

Figure 2:
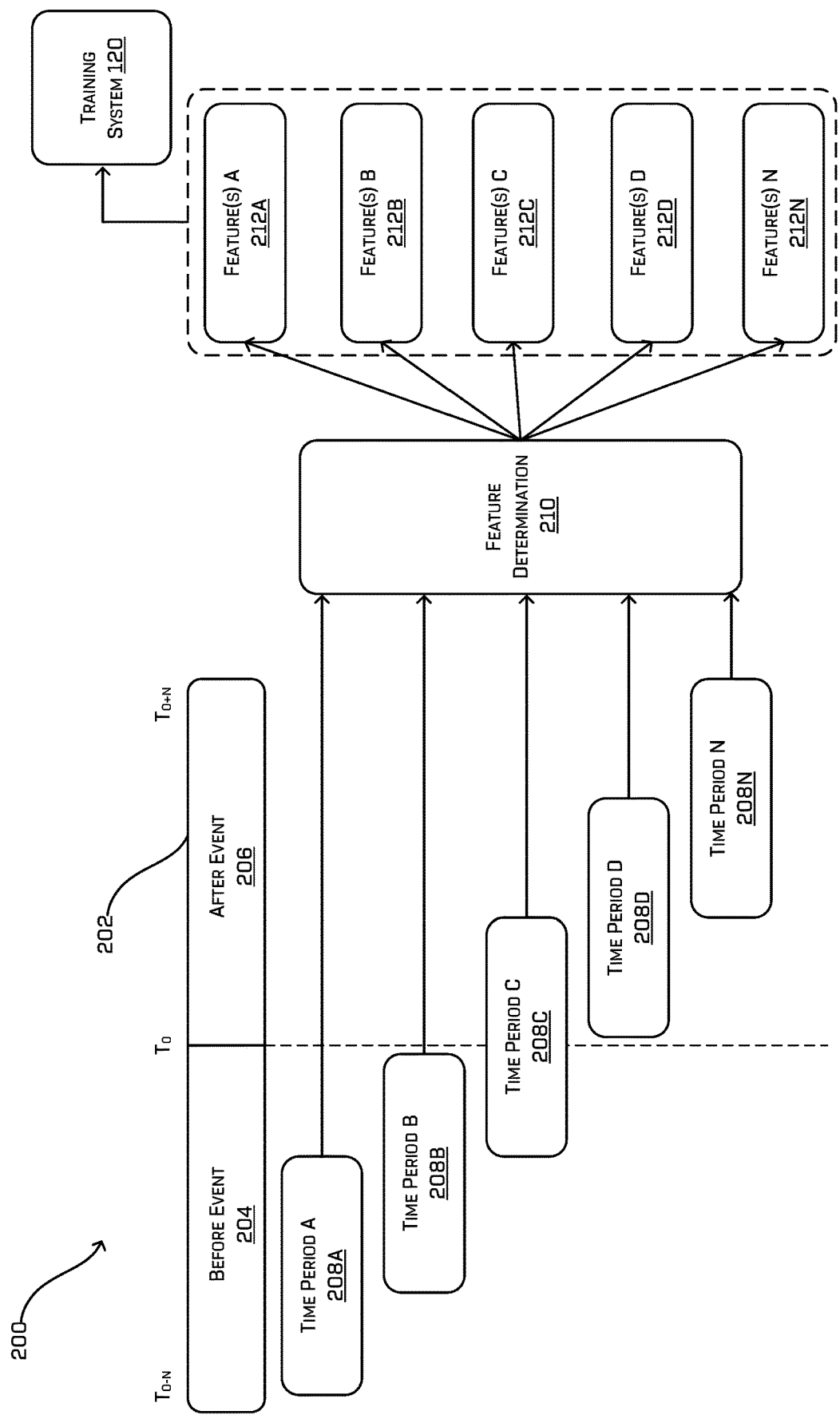
FIG. 2 is a block diagram illustrating an example process for determining features for training a machine learned model as described herein.

FIG. 2 is a block diagram illustrating an example process 200 for determining features for training a machine learned model as described herein. For ease of understanding, FIG. 2 is described in the context of FIG. 1 above, but the process 200 described herein is not so limited.

As described above with reference to FIG. 1, in at least one example, the training system 120 can analyze the sensor data 108 and/or map data to determine an event. In at least one example, the training system 120 can determine a time associated with the event (determined by the sensor data 108 and/or map data), which is shown in FIG. 2 as $T_0$. As described above, in some examples, the time can be associated with a timestamp. In at least one example, the event at $T_0$ corresponds to a cut-in event (e.g., a portion of the vehicle crossing the centerline, or some other physical indication) or, in another example, the event at $T_0$ corresponds to a non-cut-in event (e.g., which can be an arbitrary position of the agent vehicle relative to the vehicle 102).

A block 202 is shown below $T_0$, which is representative of a period of time associated with the event. The period of time associated with block 202 can be configurable. The left portion 204 of the block 202 represents time before the occurrence of the event ($T_{0-N}$–$T_0$) and the right portion 206 of the block 202 corresponds to time after the occurrence of the event ($T_0$–$T_{0+N}$). That is, in at least one example, the period of time associated with block 202 can begin before the event and end after the event. As described above, while the time prior to the event and after the event are shown as being equal, in alternative examples, the time prior to the event and after the event can be unequal. The period of time associated with the block 202 can be broken down into shorter periods of time (e.g., samples), as illustrated by time periods A-N, which are represented by blocks 208A-208N. The amount of time associated with the shorter periods of time (e.g., blocks 208A-208N) can also be configurable, and in some examples, can be broken down into even shorter periods of time. That is, in some examples, a block (e.g., block 208A) can represent one or more periods of time. As shown, in at least one example, one or more time periods (e.g., time period A 208A, time period B 208B) can be prior to the time associated with the occurrence of the event ($T_O$) and one or more time periods (e.g., time period D 208D, time period N 208N) can be after the time ($T_O$). In at least one example, one or more time periods (e.g., time period C 208C) can be associated with time prior to the time ($T_O$) and after the time ($T_O$) (e.g., associated with the event itself). In some examples, the time periods A-N can overlap. In other examples, the time periods A-N may not overlap.

In at least one example, a feature determination component 210 of the training system 120 can determine features for each sample (e.g., time period A-N). That is, for each sample, the feature determination component 210 can analyze the sensor data 108 associated with the corresponding period of time and/or map data to determine features associated with the vehicle 104 and/or the environment 100 during the period of time. For instance, the feature determination component 210 can analyze sensor data 108 associated with time period A 208A and/or map data to determine features associated with the vehicle 104 and/or the environment 100 during time period A 208A. Similarly, the feature determination component 210 can analyze sensor data 108 associated with each of the other time periods (e.g., time period B 208B-time period N 208N) and/or map data to determine features associated with each of the time periods.

In at least one example, the feature determination component 210 can determine such features as an extent of the vehicle 104 (e.g., height, weight, length, etc.), a pose of the vehicle 104 (e.g., x-coordinate, y-coordinate, z-coordinate, pitch, roll, yaw), a velocity of the vehicle 104, an acceleration of the vehicle 104, a direction of travel of the vehicle 104 (e.g., a heading), etc. from sensor data 108 and/or map data provided. As described above, in some examples, at least some of the features (e.g., the extent, the pose, etc.) can be determined by a perception system (either onboard the vehicle 102, or elsewhere) and additional features can be determined based on such features and/or other sensor data and/or map data associated with a map of the environment 100. Furthermore, the feature determination component 210 can determine a distance between the vehicle 104 and a proximate driving lane, a width of a current driving lane, etc., which can be informed by the map data, during the particular period of time. Additionally and/or alternatively, the feature determination component 210 can determine semantic feature(s) and/or interactive feature(s) associated with the vehicle 104 and/or the environment 100, as described above, during the particular period of time. In some examples, a sample can be broken into one or more shorter periods of time and features can be determined for each shorter period of time. The features for the sample (comprising each of the shorter periods of time) can be determined based on a totality of features from each of the shorter periods of time.

As illustrated in FIG. 2, the feature determination component 210 can output feature(s) A 212A, which correspond to time period A 208A, feature(s) B 212B, which correspond to time period B 208B, and so on. The features 212A-212N (as well as any features determined from the totality of the features) can be provided to the training system 120 for training a machine learned model to predict a particular event (e.g., a cut-in event), as described above.

Figure 3:
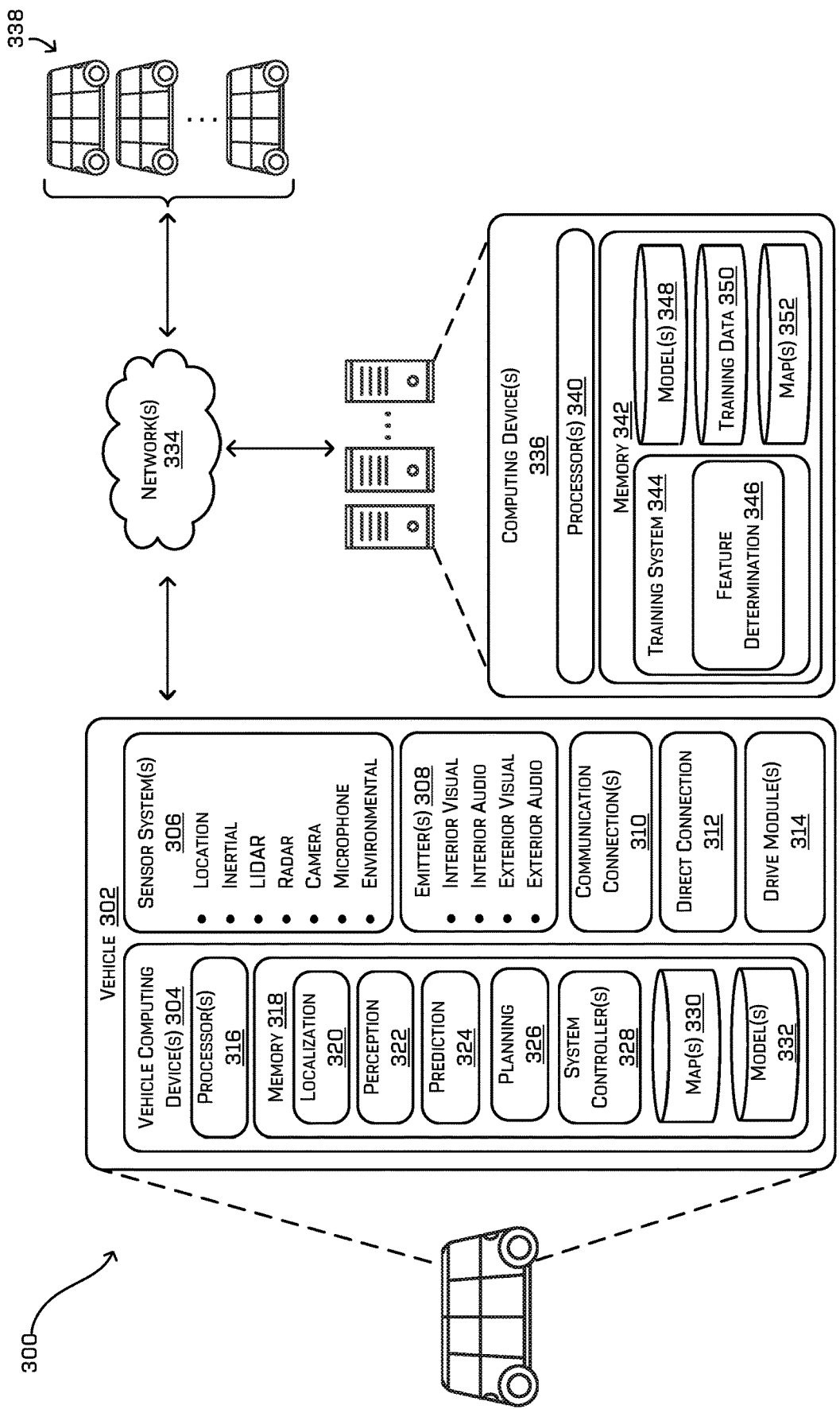
FIG. 3 is a block diagram illustrating an example system for generating and utilizing a machine learned model for use with feature-based prediction as described herein.

FIG. 3 is a block diagram illustrating an example system 300 for generating and utilizing a machine learned model for use in feature-based prediction as described herein. In at least one example, the system 300 can include a vehicle 302, which can be the same vehicle as the vehicle 102 described above with reference to FIG. 1. The vehicle 302 can include one or more vehicle computing devices 304, one or more sensor systems 306, one or more emitters 308, one or more communication connections 310, at least one direct connection 312, and one or more drive modules 314. In at least one example, the sensor system(s) 306 can correspond to the sensor system(s) 106 described above with reference to FIG. 1. Further, in at least one example, the vehicle computing device(s) 304 can correspond to the vehicle computing device(s) 110 described above with reference to FIG. 1.

The vehicle computing device(s) 304 can include processor(s) 316 and memory 318 communicatively coupled with the processor(s) 316. In the illustrated example, the vehicle 302 is an autonomous vehicle; however, the vehicle 302 could be any other type of vehicle. In the illustrated example, the memory 318 of the vehicle computing device(s) 304 stores a localization system 320, a perception system 322, a prediction system 324, a planning system 326, and one or more system controllers 328. Additionally, the memory 318 can store map(s) in a map storage 330 and/or model(s) in a model storage 332. A map can be any number of data structures modeled in two dimensions or three dimensions that are capable of providing information about an environment, such as, but not limited to, topologies (such as intersections), streets, mountain ranges, roads, terrain, and the environment in general. A model can be a machine learned model, as described herein. In an additional and/or alternative example, the map(s) and/or model(s) can be stored remotely and can be accessible to the vehicle computing device(s) 304.

In at least one example, the localization system 320 can determine a pose (position and orientation) of the vehicle 302 in relation to a local and/or global map based at least in part on sensor data received from the sensor system(s) 306 and/or map data associated with a map (e.g., of the map(s)). In at least one example, the perception system 322 can perform agent detection, segmentation, and/or classification based at least in part on sensor data received from the sensor system(s) 306. For instance, in at least one example, the perception system 322 can identify agents in the environment within which the vehicle 302 is positioned. As described above, the perception system 322 can determine extents (e.g., height, weight, length, etc.) of agents in the environment, poses (e.g., x-coordinate, y-coordinate, z-coordinate, pitch, roll, yaw) of agents in the environment, etc. In at least one example, the planning system 326 can determine routes and/or trajectories to use to control the vehicle 302 based at least in part on sensor data received from the sensor system(s) 306 and/or any determinations made by the perception system 322. Additional details of localizer systems, perception systems, and/or planning systems that are usable can be found in U.S. Pat. No. 9,612,123, issued on Apr. 4, 2017, entitled "Adaptive Mapping to Navigate Autonomous Vehicle Responsive to Physical Environment Changes," and U.S. patent application Ser. No. 15/632,208, filed Jun. 23, 2017, entitled "Trajectory Generation and Execution Architecture," both of which are incorporated herein by reference. In an example where the vehicle 302 is not an autonomous vehicle, one or more of the aforementioned systems components can be omitted from the vehicle 302.

As described above, the memory 318 can include the prediction system 324. The prediction system 324 can access sensor data from the sensor system(s) 306, map data associated with a map (e.g., of the map(s)), and, in some examples, perception data output from the perception system 322 (e.g., processed sensor data). In at least one example, the prediction system 324 can determine features associated with the agent based at least in part on the sensor data, the map data, and/or the perception data. As described above, features can include an extent of an agent (e.g., height, weight, length, etc.), a pose of an agent (e.g., x-coordinate, y-coordinate, z-coordinate, pitch, roll, yaw), a velocity of an agent, an acceleration of an agent, a direction of travel of an agent (e.g., a heading), a distance between an agent and a proximate driving lane, a width of a current driving lane, proximity to a crosswalk, semantic feature(s), interactive feature(s), etc.

The prediction system 324 can utilize one or more machine learned models (which can be stored in the model storage 332) to analyze the features to predict events. For instance, the prediction system 324 can utilize a machine learned model trained to predict cut-in events to analyze the sensor data, map data, and/or perception data to predict a cut-in event. The prediction system 324 can send prediction data to the planning system 326 so that the planning system 326 can utilize the prediction data to determine how to navigate the vehicle 302. For instance, if the prediction data indicates that an agent proximate the vehicle 302 is going to change lanes, the planning system 326 can determine a trajectory that causes the vehicle 302 to slow down to increase a follow distance between the vehicle 302 and another vehicle that the vehicle 302 is following. In some examples where the vehicle 302 is not autonomous, such a prediction system 324 may provide an indication (e.g., an audio and/or visual alert) to a driver of a predicted cut-in.

In at least one example, the localization system 320, the perception system 322, the prediction system 324, and/or the planning system 326 can process sensor data, as described above, and can send their respective outputs over network(s) 334, to computing device(s) 336. In at least one example, the localization system 320, the perception system 322, the prediction system 324, and/or the planning system 326 can send their respective outputs to the computing device(s) 336 at a particular frequency, after a lapse of a predetermined period of time, in near real-time, etc.

In at least one example, the vehicle computing device(s) 304 can include one or more system controllers 328, which can be configured to control steering, propulsion, braking, safety, emitters, communication, and other systems of the vehicle 302. These system controller(s) 328 can communicate with and/or control corresponding systems of the drive module(s) 314 and/or other components of the vehicle 302.

In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device(s) 304. Additionally and/or alternatively, the sensor system(s) 306 can send sensor data, via the network(s) 334, to the computing device(s) 336 at a particular frequency, after a lapse of a predetermined period of time, in near real-time, etc.

The vehicle 302 can also include one or more emitters 308 for emitting light and/or sound, as described above. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 308 can be disposed at various locations about the exterior and/or interior of the vehicle 302.

The vehicle 302 can also include communication connection(s) 310 that enable communication between the vehicle 302 and other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device(s) 304 to another computing device or a network, such as network(s) 334. For example, the communications connection(s) 310 can enable Wi-Fi-based communication such as via frequencies defined by the IEEE 802.11 standards, short range wireless frequencies such as BLUETOOTH or any suitable wired or wireless communications protocol that enables the respective computing device to interface with the other computing device(s).

In at least one example, the vehicle 302 can include drive module(s) 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include sensor system(s) to detect conditions of the drive module(s) 314 and/or the surroundings of the vehicle 302. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s) can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive module(s) 314. Furthermore, the drive module(s) 314 also include communication connection(s) that enable communication by the respective drive module with other local or remote computing device(s).

As described above, the vehicle 302 can send sensor data to the computing device(s) 336, via the network(s) 334. In some examples, the vehicle 302 can send raw sensor data to the computing device(s) 336. In other examples, the vehicle 302 can send processed sensor data and/or representations of sensor data to the computing device(s) 336 (e.g., data output from the localization system 320, the perception system 322, the prediction system 324, and/or the planning system 326). In some examples, the vehicle 302 can send sensor data to the computing device(s) 336 at a particular frequency, after a lapse of a predetermined period of time, in near real-time, etc.

The computing device(s) 336 can receive the sensor data (raw or processed) from the vehicle 302 and/or one or more other vehicles and/or data collection devices 338, and can train data models based on the sensor data (raw or processed). In at least one example, the computing device(s) 336 can include processor(s) 340 and memory 342 communicatively coupled with the processor(s) 340. In the illustrated example, the memory 342 of the computing device(s) 336 stores a training system 344, which can include a feature determination component 346, a model storage 348, a training data storage 350, and a map storage 352. In at least one example, the training system 344 can correspond to the training system 120, the feature determination component 346 can correspond to the feature determination component 210, the model storage 348 can correspond to the model storage 122, and the training data storage 350 can correspond to the training data storage 124 described above with reference to FIGS. 1 and 2.

The training system 344 can perform one or more operations as described above with reference to FIGS. 1 and 2. In at least one example, the training system 344 can analyze the sensor data to determine an event associated with an agent (e.g., a cut-in event, a crosswalk event, etc.). In at least one example, the training system 344 can determine a time associated with the event (which can be determined by the sensor data and/or map data). As described above, in some examples, the time can be associated with a timestamp. Then, the training system 344, via the feature determination component 346, can determine features for periods of time (e.g., samples) prior to the time, corresponding to the time, and/or following the time. That is, for each sample, the feature determination component 346 can analyze the sensor data associated with the corresponding sample and/or map data associated with map(s) in the map storage 352 to determine features associated with the acting agent and/or an environment within which the agent is positioned during the particular period of time. These features can be indicative of a behavior of the agent before, during, and/or after the event.

As described above, features can include an extent of an agent (e.g., height, weight, length, etc.), a pose of an agent (e.g., x-coordinate, y-coordinate, z-coordinate, pitch, roll, yaw), a velocity of an agent, an acceleration of an agent, a direction of travel of an agent (e.g., a heading), a distance between an agent and a proximate driving lane, a width of a current driving lane, proximity to a crosswalk, semantic feature(s), interactive feature(s), etc. In some examples, at least some of the features (e.g., the extent, the pose, etc.) can be determined by a perception system onboard a sensor data source (e.g., the vehicle 302 and/or the other vehicle(s) and/or data collection device(s) 338) and other of the features can be determined based on such features and/or other sensor data and/or map data associated with a map of the environment. In some examples, a sample can be broken into one or more shorter periods of time and the feature determination component 346 can determine features for each of the shorter periods of time. The features for the sample can be determined based on a totality of features from each of the shorter periods of time.

The feature determination component 346 can determine features associated with individual periods of time relative to each occurrence of an event, for multiple events of the same type (e.g., all cut-ins, all crossings of a crosswalk, etc.), (e.g., as observed from sensor data received from the vehicle 302 at multiple times and/or other vehicle(s) and/or other data collection device(s) 338 and/or map data) and can aggregate such data to generate training data, which can be stored in the training data storage 350. That is, the training data can include features determined for individual periods of time, which can be associated with a period of time prior to, during, and/or after one or more events. In some examples, an event can be associated with "normal behavior" (e.g., driving straight (versus changing lanes), not crossing a crosswalk (versus crossing a crosswalk), etc.). That is, in some examples, an event can be a negative behavior to the behavior of interest. Accordingly, in at least one example, for each period of time, the training data can include relevant features and an indication associated with the event (e.g., changed lanes, did not change lanes, crossed, did not cross, etc.).

In one example, events may be determined from log data (derived from sensor data) by a feature transition. As a non-limiting example, tracked vehicle agents may be associated with a lane identification (e.g., vehicle 104 in FIG. 1 may be associated with "LANE 1"). The lane identification can be monitored (e.g., via the log data) to determine a change in the lane identification, which can represent a cut-in event. That is, after changing lanes, the lane identification associated with vehicle 104 may transition to "LANE 2." The point in time at which the vehicle's associated lane identification changes may be flagged as a cut-in event. In a similar example, a tracked pedestrian may be associated with "SIDEWALK" until the pedestrian enters a crosswalk, indicative of a crosswalk event.

In at least one example, the training system 344 can access the training data and can leverage the training data to train a machine learned model. In at least one example, features (which can be generated from sensor data and/or map data) can be input into a machine learned model for training, using the known event type as the ground truth output. Once trained, such a machine learned model can be used to predict the occurrence of an event associated with an agent. As a non-limiting example, training data (e.g., periods of time associated with event(s), features associated with the periods of time, and indications associated with the event(s)) can be input into an ensemble algorithm (e.g., Boosting, Bootstrapped Aggregation (bagging), AdaBoost, Stacked Generalization (blending), Gradient Boosting Machines (GBM), Gradient Boosted Regression Trees (GBRT), Random Forest, etc.). The input data (with corresponding event type from the log data) can be analyzed by the ensemble algorithm to generate a machine learned model that leverages similar information to predict events. In at least one example, the machine learned model can output an indication of an occurrence of an event, as described above. In some examples, the output can be a binary indication, such as changing lanes or not changing lines. In other examples, the output can be associated with a confidence value associated with various events, such as 0.3 not changing lanes, 0.7 changing lanes, etc. The confidence value can indicate a likelihood that a particular event is going to occur. Of course, the numbers of confidence values are exemplary and are not intended to be limiting.

Although discussed in the context of ensemble algorithms, any type of machine learning can be used consistent with this disclosure. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Artificial Neural Network (ANN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc.

In some examples, the one or more machine learned models can be trained and stored in the model storage 348. In some examples, the one or more machine learned models can be stored on and/or accessible to the vehicle computing device(s) 304 for use by one or more of the systems associated with the vehicle computing device(s) 304 in near-real time. In additional and/or alternative examples, the one or more machine learned models can be provisioned to vehicles (e.g., vehicle 302) for use by one or more of the systems associated with the vehicle computing device(s) 304 in near-real time.

The processor(s) 316 of the vehicle 302 and the processor(s) 340 of the computing device(s) 336 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 342 are examples of non-transitory computer-readable media. Memory 318 and 342 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the computing device(s) 336 and/or components of the computing device(s) 336 can be associated with the vehicle 302. That is, the vehicle 302 can perform one or more of the functions associated with the computing device(s) 336, and vice versa.

Figure 4:
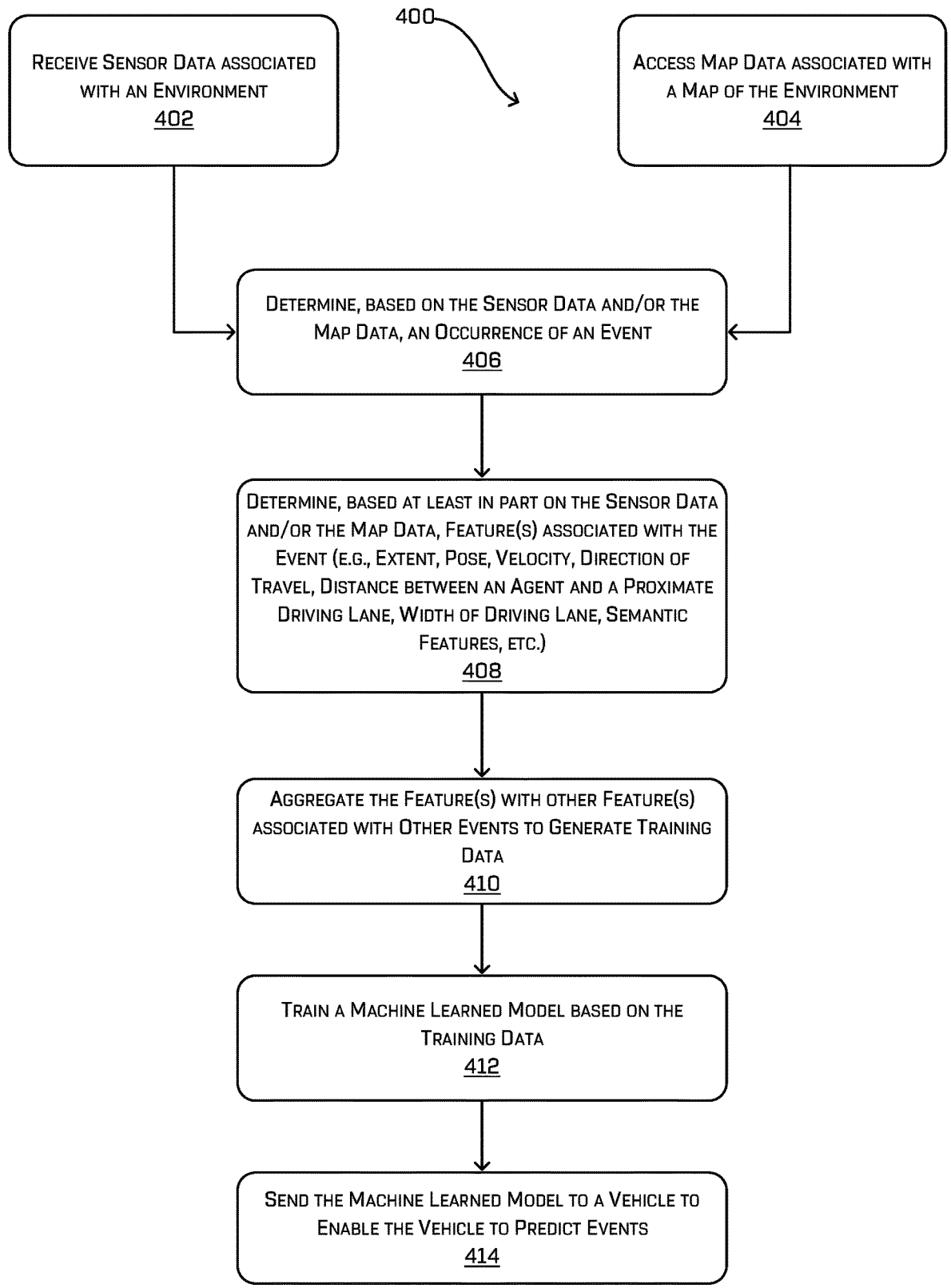
FIG. 4 is a flowchart illustrating an example method for training a prediction model based at least in part on features associated with events as described herein.
Figure 5:
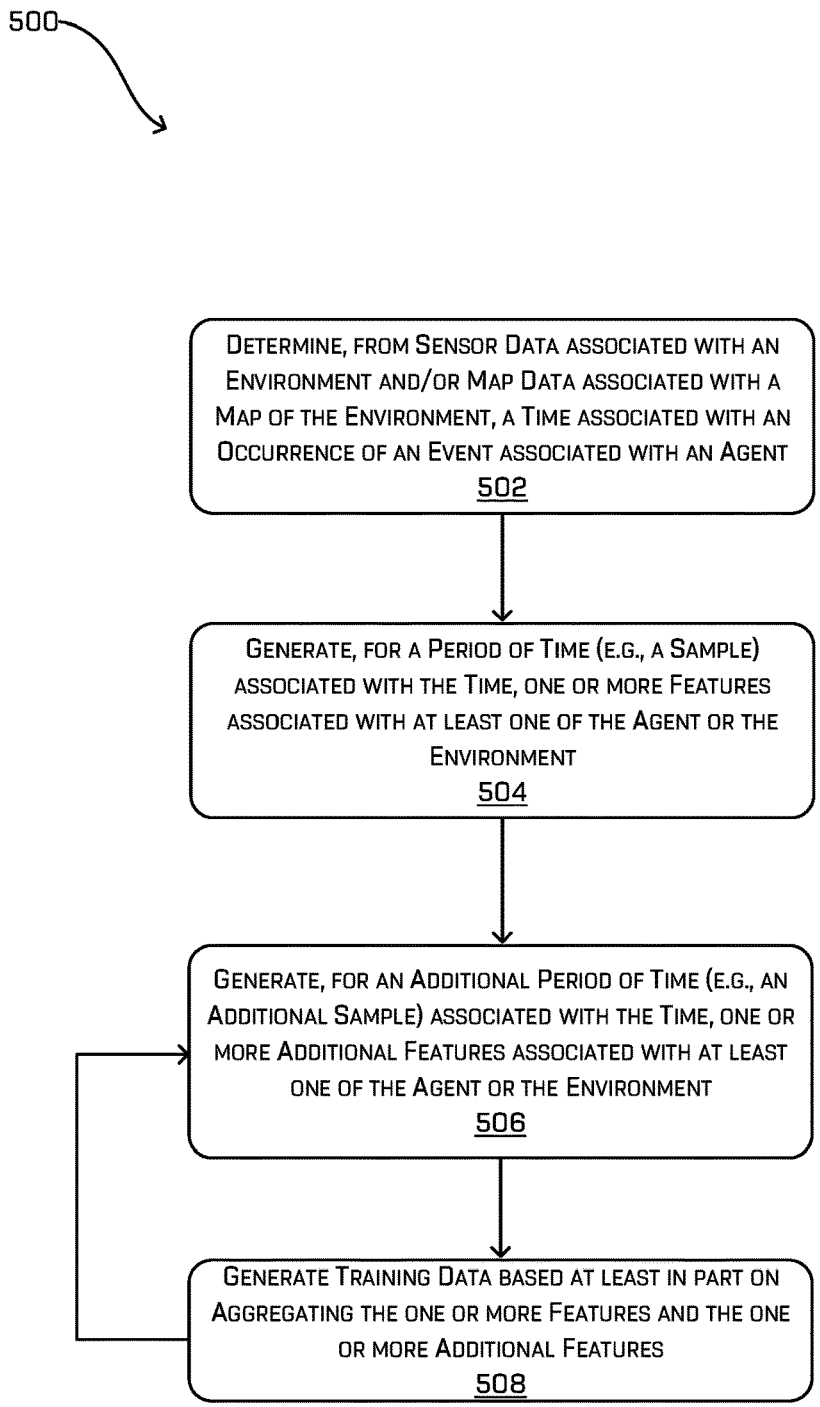
FIG. 5 is a flowchart illustrating an example method for generating training data based at least in part on features associated with events as described herein.
Figure 6:
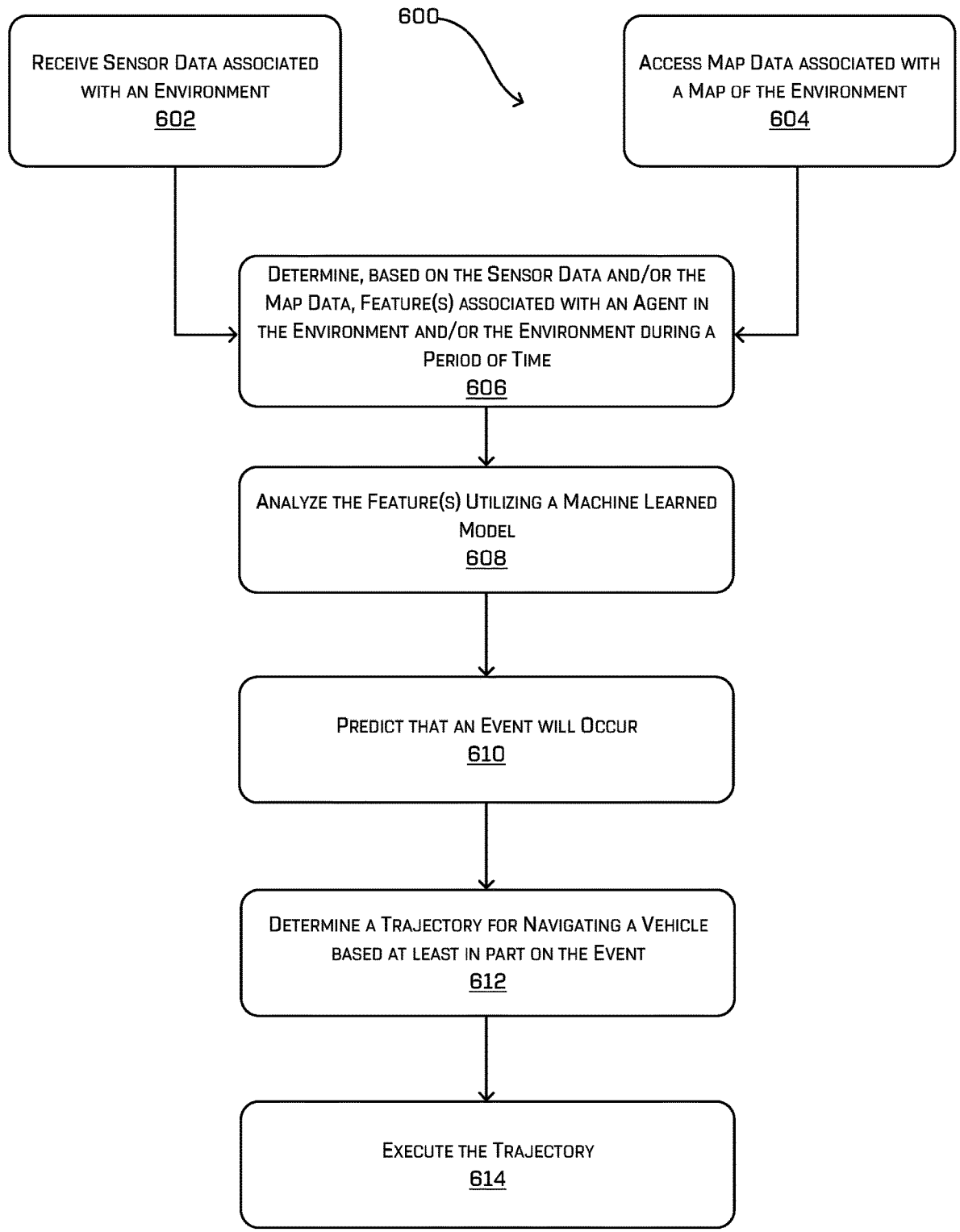
FIG. 6 is a flowchart illustrating an example method for implementing feature-based prediction as described herein.

FIGS. 4-6 are flowcharts showing example methods involving feature-based prediction as described herein. The methods illustrated in FIGS. 4-6 are described with reference to the vehicle 302 shown in FIG. 3 for convenience and ease of understanding. However, the methods illustrated in FIGS. 4-6 are not limited to being performed using the vehicle 302 shown in FIG. 3, and can be implemented using any of the other vehicles described in this application, as well as vehicles other than those described herein. Moreover, the vehicle 302 described herein is not limited to performing the methods illustrated in FIGS. 4-6.

The methods 400-600 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 400-600 can be combined in whole or in part with each other or with other methods.

FIG. 4 is a flowchart illustrating an example method 400 for training a prediction model based at least in part on features associated with events as described herein.

Block 402 illustrates receiving sensor data, at least a portion of the sensor data being associated with an environment. As described above, a vehicle 302 can include sensor system(s) 306. In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can provide input to the vehicle computing device(s) 304, and one or more systems of the vehicle computing device(s) 304 can utilize the input. For instance, in at least one example, the vehicle computing device(s) 304 can receive the input for processing by the localization system 320, the perception system 322, the prediction system 324, and/or the planning system 326.

As described above, in at least one example, the vehicle 302 can send sensor data to the computing device(s) 336, via the network(s) 334. In some examples, the vehicle 302 can send raw sensor data to the computing device(s) 336. In other examples, the vehicle 302 can send processed sensor data and/or representations of sensor data to the computing device(s) 336 (e.g., data output from the localization system 320, the perception system 322, the prediction system 324, and/or the planning system 326). In some examples, the vehicle 302 can send sensor data to the computing device(s) 336 at a particular frequency, after a lapse of a predetermined period of time, in near real-time, etc. As described above, sensor data collected over time can correspond to log data.

Block 404 illustrates accessing map data associated with a map of the environment. As described above, in at least one example, the computing device(s) can store one or more maps in a map storage 352. As described above, a map can be any number of data structures modeled in two dimensions or three dimensions that are capable of providing information about an environment, such as, but not limited to, topologies (such as intersections), streets, mountain ranges, roads, terrain, and the environment in general. In at least one example, the training system 344 can access map data associated with the map(s) as described below.

Block 406 illustrates determining, based on the sensor data and/or the map data, an occurrence of an event. In at least one example, the training system 344 can analyze the sensor data and/or the map data to determine an event associated with an agent (e.g., a cut-in event, a crosswalk event, etc.). In at least one example, the training system 344 can determine a time associated with the event (which can be determined by the sensor data and/or map data). As described above, in some examples, the time can be associated with a timestamp. In some examples, such an event may be determined based on a transition of a feature of log data (generated from the sensor data). For instance, a lane identification may be associated with an agent detected in the sensor data and based on the map data. A change in lane identification associated with an agent (e.g., from "LANE 1" to "LANE 2") may be indicative of a cut-in event. Accordingly, in at least one example, the training system 344 can utilize log data (generated from sensor data) to monitor a lane identification associated with an agent and, based on determining a change to the lane identification, can determine an occurrence of an event (e.g., a cut-in event). Similar transitions (or non transitions) may be used to determine other types of events. The time of the transition may be associated with the time of the event.

Block 408 illustrates determining feature(s) associated with the event. In at least one example, the feature determination component 346, can determine features for a period of time associated with the event. In at least one example, the period of time can begin before the event and end after the event. The period of time can be partitioned into one or more samples (e.g., shorter periods of time) and individual samples can correspond to periods of time prior to the time, corresponding to the time, and/or following the time. That is, for each sample, the feature determination component 346 can analyze the sensor data associated with the corresponding period of time and/or map data to determine features associated with the acting agent and/or an environment within which the agent is positioned during the particular period of time. Collectively, these features can be indicative of a behavior of the agent before, during, and/or after the event. As described above, features can include an extent of an agent (e.g., height, weight, length, etc.), a pose of an agent (e.g., x-coordinate, y-coordinate, z-coordinate, pitch, roll, yaw), a velocity of an agent, an acceleration of an agent, a direction of travel of an agent (e.g., a heading), a distance between an agent and a proximate driving lane, a width of a current driving lane, proximity to a crosswalk, semantic feature(s), interactive feature(s), etc. In some examples, at least some of the features (e.g., the extent, the pose, etc.) can be determined by the perception system 322 (e.g., by the vehicle 302 and/or the other vehicle(s) and/or data collection device(s) 338, or otherwise by any computing device) and additional features can be determined based on such features (e.g., a yaw rate as described above) and/or other sensor data and/or map data associated with a map of the environment. Additional details associated with feature determination are described below with reference to FIG. 5.

Block 410 illustrates aggregating the feature(s) with other feature(s) associated with other events to generate training data. The feature determination component 346 can determine features associated with individual periods of time relative to multiple events of the same type (e.g., cut-ins, crossing of cross walks, etc.) (e.g., as observed from sensor data received from the vehicle 302 at one or more times and/or other vehicle(s) and/or other data collection device(s) 338 and/or map data), and can aggregate such data to generate training data, which can be stored in the training data storage 350. That is, the training data can include features determined for individual periods of time, which can be associated with a period of time prior to, during, and/or after one or more events. In some examples, an event can be associated with "normal behavior" (e.g., driving straight (versus changing lanes), not crossing a crosswalk (versus crossing a crosswalk), etc.). That is, in some examples, an event can be a negative behavior to the behavior of interest. Accordingly, in at least one example, for each period of time, the training data can include relevant features and an indication associated with the event (e.g., changed lanes, did not change lanes, crossed, did not cross, etc.).

Block 412 training a machine learned model based on the training data. In at least one example, the training system 344 can access the training data and can leverage the training data to train a machine learned model. In at least one example, features (which can be generated from sensor data and/or map data) can be input into a machine learned model. Such a machine learned model can be used to predict the occurrence of an event associated with an agent. As a non-limiting example, training data (e.g., periods of time associated with event(s), features associated with the periods of time, and indications associated with the event(s)) can be input into an ensemble algorithm (e.g., Boosting, Bootstrapped Aggregation (Bagging), AdaBoost, Stacked Generalization (blending), Gradient Boosting Machines (GBM), Gradient Boosted Regression Trees (GBRT), Random Forest, etc.). The input data (with corresponding ground truth of the determined event type) can be analyzed by the ensemble algorithm to generate a machine learned model that leverages similar information to predict events. In at least one example, the machine learned model can output an indication of an occurrence of an event, as described above. In some examples, the output can be a binary indication, such as changing lanes or not changing lines. In other examples, the output can be associated with a confidence value associated with various events, such as 0.3 not changing lanes, 0.7 changing lanes, etc. The confidence value can indicate a likelihood that a particular event is going to occur. As described above, although discussed in the context of ensemble algorithms, any type of machine learning can be used consistent with this disclosure.

Block 414 illustrates sending the machine learned model to a vehicle to enable the vehicle to predict events. In some examples, the one or more machine learned models can be trained and stored in the model storage 348. In some examples, the one or more machine learned models can be stored on and/or accessible to the vehicle computing device(s) 304 for use by one or more of the systems associated with the vehicle computing device(s) 304 in near-real time. In additional and/or alternative examples, the one or more machine learned models can be provisioned to vehicles (e.g., vehicle 302) for use by one or more of the systems associated with the vehicle computing device(s) 304 in near-real time. Additional details associated with using the machine learned model onboard a vehicle are described below with reference to FIG. 6.

It should be noted that the training system 344 can update and/or retrain the machine learned models over time. That is, in some examples, the training system 344 can receive updated data (e.g., sensor data, map data, prediction data output from the prediction system 324, etc.) and can utilize the updated data to update and/or retrain the machine learned models over time in either an on-line configuration (updating the machine learned model based on instantly acquired data) or an off-line configuration (training the machine learned model with a batch of data).

FIG. 5 is a flowchart illustrating an example method 500 for generating training data based at least in part on features associated with events as described herein.

Block 502 illustrates determining, from sensor data associated with an environment and/or map data associated with a map of the environment, a time associated with an occurrence of an event associated with an agent. As described above, in at least one example, the training system 344 can analyze sensor data and/or map data to determine an event associated with an agent (e.g., a cut-in event, a crosswalk event, etc.). In some examples, the event may be determined based on a transition of a feature associated with a tracked agent (as determined from log data derived from sensor data). In at least one example, the training system 344 can determine a time associated with the event (which can be determined by the sensor data and/or map data). As described above, in some examples, the time can be associated with a timestamp.

Block 504 illustrates generating, for a period of time (e.g., sample) associated with the time, one or more features associated with at least one of the agent or the environment. In at least one example, the training system 344 can partition a period of time that begins prior to the event and end after the event into one or more samples (e.g., shorter periods of time). The training system 344, via the feature determination component 346, can determine features for each of the samples, which can correspond to periods of time prior to the time, corresponding to the time, and/or following the time. As described above, the periods of time associated with the samples can be configurable.

In at least one example, the feature determination component 346 can determine features for a period of time (e.g., a sample) based on sensor data associated with the period of time and/or map data. In some examples, the period of time can be prior to the time associated with the event. In other examples, the period of time can be at or after the time associated with the event. As described above, in some examples, the sample corresponding to the period of time can be broken into one or more shorter periods of time and features can be determined for each shorter period of time. In such examples, the features for the sample can be determined based on a totality of features from each of the shorter periods of time.

Block 506 illustrates generating, for an additional period of time (e.g., an additional sample) associated with the time, one or more additional features associated with at least one of the agent or the environment. In at least one example, the feature determination component 346 can determine features for an additional period of time (e.g., an additional sample) based on sensor data associated with the additional period of time and/or map data. In some examples, the additional period of time can be prior to the time associated with the event. In other examples, the additional period of time can be at or after the time associated with the event. In at least one example, the additional period of time can be subsequent to the period of time described in block 504. As described above, in some examples, the additional sample corresponding to the additional period of time can be broken into one or more shorter periods of time and features can be determined for each shorter period of time. In such examples, the features for the additional sample can be determined based on a totality of features from each of the shorter periods of time.

Block 508 illustrates generating training data based at least in part on aggregating the one or more features and the one or more additional features. As described above, the feature determination component 346 can determine features associated with individual periods of time relative to multiple events of the same type (e.g., cut-ins, crossing a cross walk, etc.) (e.g., as observed from sensor data received from the vehicle 302 at one or more times and/or other vehicle(s) and/or other data collection device(s) 338 and/or map data), and can aggregate such data to generate training data, which can be stored in the training data storage 350. That is, the training data can include the one or more features determined for at least the period of time and the one or more additional features determined for the additional period of time, as well as the type of event detected to associate with the extracted features. The feature determination component 346 can return to block 506 to determine features for additional periods of time, which can be associated with a period of time prior to, during, and/or after one or more events. Such features can additionally be added to the one or more features and the one or more additional features to generate the training data.

FIG. 6 is a flowchart illustrating an example method 600 for implementing feature-based prediction as described herein.

Block 602 illustrates receiving sensor data, at least a portion of the sensor data being associated with an environment. As described above, a vehicle 302 can include sensor system(s) 306. In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can provide input to the vehicle computing device(s) 304. In at least one example, the vehicle computing device(s) 304 can receive the input for processing by the localization system 320, the perception system 322, the prediction system 324, and/or the planning system 326.

Block 604 illustrates accessing map data associated with a map of the environment. As described above, in at least one example, the vehicle computing device(s) 304 can store one or more maps. In an additional and/or alternative example, the map(s) can be stored remotely and accessible to the vehicle computing device(s) 304. As described above, a map can be any number of data structures modeled in two dimensions or three dimensions that are capable of providing information about an environment, such as, but not limited to, topologies (such as intersections), streets, mountain ranges, roads, terrain, and the environment in general. In at least one example, the vehicle computing device(s) 304 can access map data associated with the map(s) for processing by the localization system 320, the perception system 322, the prediction system 324, and/or the planning system 326.

Block 606 illustrates determining, based on the sensor data and/or the map data, feature(s) associated with an agent in the environment and/or the environment during a period of time. In at least one example, the perception system 322 can perform agent detection, segmentation, and/or classification based at least in part on sensor data received from the sensor system(s) 306. For instance, in at least one example, the perception system 322 can identify agents in the environment within which the vehicle 302 is positioned. As described above, the perception system 322 can determine extents (e.g., height, weight, length, etc.) of agents in the environment, poses (e.g., x-coordinate, y-coordinate, z-coordinate, pitch, roll, yaw) of agents in the environment, etc. In at least one example, the perception system 322 can identify an agent in the environment and can determine at least one of an extent and/or pose associated with the agent.

In at least one example, the prediction system 324 can access sensor data from the sensor system(s) 306, map data associated with a map (e.g., of the map(s)), and, in some examples, perception data output from the perception system 322 (e.g., processed sensor data). In at least one example, the prediction system 324 can determine features associated with the agent based at least in part on the sensor data, the map data, and/or the perception data. As described above, features can include an extent of an agent (e.g., height, weight, length, etc.), a pose of an agent (e.g., x-coordinate, y-coordinate, z-coordinate, pitch, roll, yaw), a velocity of an agent, an acceleration of an agent, a direction of travel of an agent (e.g., a heading), a distance between an agent and a proximate driving lane, a width of a current driving lane, proximity to a crosswalk, semantic feature(s), interactive feature(s), etc. Additionally, or alternatively, map data may be associated with agents detected in the perception system, such as associating a lane identification with a vehicle, associating a pedestrian with a crosswalk or a sidewalk, and the like. Transitions of such associations may be used as indications of an event and event type.

In at least one example, the features can be associated with a period of time corresponding to a sampling rate (e.g., a rate at which the vehicle 302 collects and/or analyzes sensor data).

Block 608 illustrates analyzing the feature(s) utilizing a machine learned model. The prediction system 324 can utilize one or more machine learned models (which can be stored in the model storage 332) to analyze the feature(s) to predict events. In at least one example, a machine learned model can output a binary indication regarding whether an event is going to occur (e.g., lane change, no lane change). In other examples, a machine learned model can output confidence scores associated with one or more events, as described above.

Block 610 illustrates predicting that an event will occur. In at least one example, a machine learned model can output a binary indication regarding whether an event is going to occur (e.g., lane change, no lane change). In such an example, the prediction system 324 can determine that the event is going to occur based on such an indication. In other examples, a machine learned model can output confidence scores associated with one or more events, as described above. In such examples, the prediction system 324 can analyze the one or more confidence scores to determine a greatest confidence score and/or a confidence score that satisfies a threshold (e.g., meets or exceeds), and can determine that an event is going to occur based on the greatest confidence score and/or the confidence score that satisfies (e.g., meets or exceeds) the threshold. For instance, if a confidence score associated with a cut-in event is associated with the greatest confidence score, then the prediction system 324 can determine that a cut-in event is going to occur. Additionally and/or alternatively, if a confidence score associated with a cut-in event satisfies a threshold (e.g., meets or exceeds), then the prediction system 324 can determine that a cut-in event is going to occur.

Block 612 illustrates determining a trajectory for navigating a vehicle based at least in part on the event. In at least one example, the prediction system 324 can send prediction data to the planning system 326 so that the planning system 326 can utilize the prediction data to determine how to navigate the vehicle 302. That is, the planning system 326 can determine a trajectory for navigating the vehicle 302 in order to respond to the event. For instance, if the prediction data indicates that an agent proximate the vehicle 302 is going to change lanes, the planning system 326 can determine a trajectory that causes the vehicle 302 to slow down to increase a follow distance between the vehicle 302 and another vehicle that the vehicle 302 is following. In some examples the planning system 326 can determine a trajectory that causes the vehicle 302 to change lanes in response to the cut-in event. Other trajectories are contemplated herein, and these examples are not intended to be limiting.

Block 614 illustrates executing the trajectory. As described above, the vehicle computing device(s) 304 can include one or more system controllers 328, which can be configured to control steering, propulsion, braking, safety, emitters, communication, and other systems of the vehicle 302. These system controller(s) 328 can communicate with and/or control corresponding systems of the drive module(s) 314 and/or other components of the vehicle 302. In at least one example, the system controller(s) 328 can receive the trajectory and can communicate with and/or control corresponding systems of the drive module(s) 314 and/or other components of the vehicle 302 such to cause the vehicle 302 to navigate along the trajectory.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A. A system comprising: a processor; and non-transitory computer-readable media storing instructions executable by the processor, wherein the instructions, when executed by the processor, cause the processor to perform actions comprising: receiving sensor data from a sensor on an autonomous vehicle; detecting a vehicle in the sensor data; associating the vehicle with a lane identification; determining, based at least in part on a change of the lane identification of the vehicle, the occurrence of a cut-in event, the cut-in event having an associated time; determining sets of features associated with the cut-in event, the sets of features being associated with a period of time that begins before the event and ends after the event; aggregating the sets of features with additional sets of features associated with additional cut-in events to generate training data; training, based at least in part on the training data, a machine learned model for predicting cut-in events; and sending the machine learned model to the autonomous vehicle for predicting the cut-in events by the autonomous vehicle.

B. The system as paragraph A recites, wherein the sensor comprises a light detection and ranging (LIDAR) sensor, a radio detection and ranging (RADAR) sensor, a sound navigation and ranging (SONAR) sensor, a location sensor, an inertial sensor, a camera, a microphone, or an environment sensor.

C. The system as any of paragraphs A or B recite, wherein a set of features includes one or more of: an extent of the vehicle associated with the cut-in event; a pose of the vehicle associated with the past cut-in event; a velocity of the vehicle; an acceleration of the vehicle; a direction of travel of the vehicle; a distance between the vehicle and a proximate lane; a width of a lane within which the vehicle is positioned; and a semantic feature associated with the vehicle or the environment.

D. The system as any of paragraphs A-C recite, the actions further comprising: determining, based at least in part on the sensor data, other sets of features associated with straight driving events; and adding the other sets of features to the training data.

E. The system as any of paragraphs A-D recite, wherein determining the sets of features associated with the cut-in event comprises determining individual sets of features associated with individual samples within the period of time.

F. A method comprising: receiving sensor data from a sensor on a vehicle in an environment, the sensor data indicating a first event associated with an object in the environment; determining, based at least in part on the sensor data, a time associated with the first event; determining a feature associated with a period of time relative to the time; aggregating the feature with an additional feature associated with a second event to generate training data; training, based at least in part on the training data, a machine learned model for predicting new events; and transmitting the machine learned model to the vehicle, the vehicle configured to adapt driving operations based at least in part on an output of the machine learned model.

G. The method as paragraph F recites, wherein the feature comprises: an extent of the object; a pose of the object; a velocity of the object; an acceleration of the object; a direction of travel of the object; or a semantic feature associated with the object or the environment.

H. The method as any of paragraphs F or G recite, wherein determining the feature comprises: accessing map data associated with a map of the environment; and determining, based at least in part on the map data, the feature.

I. The method as any of paragraphs F-H recite, wherein the period of time begins before the first event and ends after the first event.

J. The method as paragraph I recites, further comprising: dividing the period of time into a number of samples; and determining individual sample features for individual samples of the number of samples, the feature corresponding to a sample feature of the individual sample features.

K. The method as any of paragraphs F-J recite, further comprising: determining, based at least in part on the sensor data, a negative feature associated with a negative event; and adding the negative feature to the training data.

L. The method as any of paragraphs F-K recite, wherein the machine learned model comprises a gradient boosted decision tree.

M. The method as any of paragraphs F-L recite, wherein the event comprises a cut-in or crossing a crosswalk.

N. The method as any of paragraphs F-M recite, wherein the object is an additional vehicle, and wherein the event is a cut-in event, the method further comprising: associating, based at least in part on the map data, a lane identification with the additional vehicle; monitoring the lane identification for a change; and determining, based at least in part on the change, the event.

O. A non-transitory computer-readable medium having a set of instructions that, when executed, cause one or more processors to perform operations comprising: receiving sensor data from a sensor disposed about a vehicle in an environment, the sensor data indicative of an event associated with an object in the environment; determining, based at least in part on the sensor data, a time associated with the event; determining a set of features associated with a period of time relative to the time; aggregating the set of features with an additional set of features associated with an additional event to generate training data; training, based at least in part on the training data, a machine learned model for predicting new events; and transmitting the machine learned model to the vehicle, the vehicle configured to alter a drive operation based, at least in part, on an output of the machine learned model.

P. The non-transitory computer-readable medium as paragraph O recites, the operations further comprising: accessing map data associated with a map of the environment; and determining at least one feature of the set of features based at least in part on the map data.

Q. The non-transitory computer-readable medium as any of paragraphs O or P recite, wherein the set of features comprises: an extent of the object; a pose of the object; a velocity of the object; an acceleration of the object; a direction of travel of the object; or a semantic feature associated with the object or the environment.

R. The non-transitory computer-readable medium as any of paragraphs O-Q recite, wherein determining the set of features comprises: dividing the period of time into a number of samples, each sample comprising a portion of the sensor data associated with the period of time; determining a sample feature for each sample; and determining, based at least in part on the sample feature determined for each sample, the set of features.

S. The non-transitory computer-readable medium as any of paragraphs O-R recite, wherein the object is an additional vehicle, and further wherein the event is a cut-in event, the method further comprising: associating a lane identification with the additional vehicle; determining a change of the lane identification; and determining, based at least in part on the change, the event.

T. The non-transitory computer-readable medium as any of paragraphs O-S recite, wherein the event comprises a cut-in event or a crosswalk event, and further wherein the machine learned model comprises a gradient boosted decision tree.

While paragraphs A-E are described above with respect to a system, it is understood in the context of this document that the content of paragraphs A-E may also be implemented via a method, device, and/or computer storage media. While paragraphs F-N are described above with respect to a method, it is understood in the context of this document that the content of paragraphs F-N may also be implemented via a system, device, and/or computer storage media. While paragraphs O-T are described above with respect to a non-transitory computer-readable medium, it is understood in the context of this document that the content of paragraphs O-T may also be implemented via a method, device, and/or system.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described.

The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A first vehicle comprising:
 one or more processors; and
 non-transitory computer-readable media storing instructions executable by the one or more processors, wherein the instructions, when executed by the one or more processors, cause the first vehicle to perform actions comprising:
 receiving sensor data from a sensor of the first vehicle traveling in a lane;
 receiving map data associated with an environment associated with the first vehicle;
 inputting a representation of the sensor data and the map data into a machine learned model trained to predict events proximate the first vehicle, the machine learned model trained based at least in part on a set of representations of previously recorded sensor data and map data collected at different time periods from one or more past cut-in events;
 receiving, from the machine learned model, an indication of a new event proximate the first vehicle driving in the lane, the new event comprising a second vehicle being predicted to enter the lane from a second lane; and
 determining a trajectory to navigate the first vehicle based at least in part on the indication of the new event proximate the vehicle driving in the lane.

2. The vehicle of claim 1, wherein:
 the lane is a first lane;
 each representation of the sensor data comprises a set of features aggregated over a period of time, the set of features indicative of one or more of:
 a set of speeds of the second vehicle;
 a set of positions of the second vehicle;
 a set of orientations of the second vehicle;
 a set of accelerations of the second vehicle;
 a set of distance between the second vehicle and the first lane;
 a width of the second lane; and
 a semantic feature associated with the second vehicle or the environment.

3. The vehicle of claim 2, wherein:
 the instructions cause the vehicle to perform further actions comprising:
 determining the trajectory to navigate the first vehicle that causes the first vehicle to slow down to increase a follow distance between the first vehicle and another vehicle that the first vehicle is following to allow the second vehicle to enter the first lane.

4. The vehicle of claim 2, wherein:
 the instructions cause the vehicle to perform further actions comprising:
 determining the trajectory to navigate the first vehicle that causes the first vehicle to change to another lane to allow the second vehicle to enter the first lane.

5. The vehicle of claim 1, wherein the machine learned model comprises at least a neural network model.

6. The vehicle of claim 1, wherein the sensor comprises a light detection and ranging (LIDAR) sensor, a radio detection and ranging (RADAR) sensor, a sound navigation and ranging (SONAR) sensor, a location sensor, an inertial sensor, a camera, a microphone, or an environment sensor.

7. A method comprising:
receiving sensor data from a sensor of a first vehicle traveling in a first lane of an environment, the sensor data associated with a second vehicle traveling in a second lane in the environment;
receiving map data associated with the environment;
analyzing the sensor data and the map data using a machine learned model trained to predict a first event proximate the first vehicle in the environment, the machine learned model trained based at least in part on a set of representations of previously recorded sensor data and map data collected at different time periods from one or more past cut-in events;
receiving, from the machine learned model, an indication of the first event proximate the first vehicle in the environment, the first event comprising a cut-in event of the second vehicle being predicted to enter the first lane from the second lane; and
determining a trajectory to navigate the first vehicle in the environment in response to the indication of first event comprising the cut-in event of the second vehicle being predicted to enter the first lane from the second lane.

8. The method of claim 7, wherein:
analyzing the sensor data comprises:
determining, based at least in part on the sensor data, a set of features comprising one or more of:
a pose of the second vehicle,
a velocity of the second vehicle,
an acceleration of the second vehicle,
a direction of travel of the second vehicle,
a distance between the second vehicle and a proximate lane,
a width of a lane within which the second vehicle is positioned, or
a semantic feature associated with the second vehicle or the environment;
aggregating one or more sets of features over a period of time; and
inputting the one or more sets of features into the machine learned model.

9. The method of claim 8, wherein the period of time comprises at least one second.

10. The method of claim 8, further comprising:
determining, based at least in part on the sensor data, a second set of features associated with the cut-in event in real-time; and
adding the second set of features to the training data.

11. The method of claim 7, wherein the machine learned model comprises a gradient boosted decision tree.

12. The method of claim 7, wherein the sensor comprises a light detection and ranging (LIDAR) sensor, a radio detection and ranging (RADAR) sensor, a sound navigation and ranging (SONAR) sensor, a location sensor, an inertial sensor, a camera, a microphone, or an environment sensor.

13. A non-transitory computer-readable medium having a set of instructions that, when executed, cause one or more processors to perform operations comprising:
receiving sensor data from a sensor of a first vehicle traveling in a first lane of an environment, the sensor data representing a second vehicle traveling in a second lane in the environment;
analyzing the sensor data and map data using a machine learned model trained to predict a first event proximate the first vehicle in the environment, the machine learned model trained based at least in part on a set of representations of previously recorded sensor data and map data collected at different time periods from one or more past cut-in events;
receiving, from the machine learned model, an indication of the first event proximate the first vehicle in the environment, the first event comprising a cut-in event of the second vehicle being predicted to enter the first lane from the second lane; and
determining a trajectory to navigate the first vehicle in the environment in response to the indication of the first event comprising the cut-in event of the second vehicle being predicted to enter the first lane from the second lane.

14. The non-transitory computer-readable medium of claim 13, wherein:
analyzing the sensor data comprises:
determining, based at least in part on the sensor data, a set of features comprising one or more of:
a pose of the second vehicle,
a velocity of the second vehicle,
an acceleration of the second vehicle,
a direction of travel of the second vehicle,
a distance between the second vehicle and a proximate lane,
a width of a lane within which the second vehicle is positioned, or
a semantic feature associated with the second vehicle or the environment;
aggregating one or more sets of features over a period of time; and
inputting the one or more sets of features into the machine learned model.

15. The non-transitory computer-readable medium of claim 13, wherein the machine learned model comprises a gradient boosted decision tree.

16. The non-transitory computer-readable medium of claim 15, wherein the training data comprises data indicative of a change of a lane identification associated with a sample vehicle.

17. The non-transitory computer-readable medium of claim 15, wherein instructions, when executed, further cause the one or more processors to perform operations comprising:
determining, based at least in part on the sensor data, a second set of features associated with the cut-in event in real-time; and
adding the second set of features to the training data.

18. The vehicle of claim 1, wherein the instructions, when executed by the one or more processors, cause the first vehicle to further perform actions comprising:
determining a second trajectory to navigate the first vehicle that causes the vehicle to slow down to stop to allow a pedestrian to cross the lane in which the first vehicle is traveling.

19. The method of claim 7, further comprising receiving additional sensor data from the sensor of the first vehicle traveling in the first lane of the environment, the sensor data associated with a pedestrian crossing the first lane.

20. The non-transitory computer-readable medium of claim 13, further comprising instructions that, when executed, further cause the one or more processors to perform operations comprising:
determining a second trajectory to navigate the first vehicle in response to an indication of a pedestrian being predicted to cross the first lane.

* * * * *